United States Patent
Kursawe et al.

(10) Patent No.: US 10,286,575 B2
(45) Date of Patent: May 14, 2019

(54) APPARATUS AND METHOD FOR HEATING PLASTIC PREFORMS BY MEANS OF MICROWAVES USING AN ADAPTABLE BASE REFLECTOR

(71) Applicant: KRONES AG, Neutraubling (DE)

(72) Inventors: Andreas Kursawe, Straubing (DE); Florian Fuchs, Regensburg (DE); Johann Zimmerer, Bernhardswald (DE); Konrad Senn, Regensburg (DE); Martin Kammerl, Regenstauf (DE)

(73) Assignee: KRONES AG, Neutraubling (DE)

( * ) Notice: Subject to any disclaimer, the term of this patent is extended or adjusted under 35 U.S.C. 154(b) by 373 days.

(21) Appl. No.: 15/091,877

(22) Filed: Apr. 6, 2016

(65) Prior Publication Data
US 2016/0318211 A1    Nov. 3, 2016

(30) Foreign Application Priority Data

Apr. 30, 2015    (DE) .......................... 10 2015 106 744

(51) Int. Cl.
*B29B 13/02*    (2006.01)
*B29B 13/08*    (2006.01)
(Continued)

(52) U.S. Cl.
CPC ............ *B29B 13/024* (2013.01); *B29C 49/68* (2013.01); *H05B 6/74* (2013.01); *H05B 6/80* (2013.01);
(Continued)

(58) Field of Classification Search
CPC ... B29B 13/024; B29B 13/08; B29C 49/6409; B29C 49/68
See application file for complete search history.

(56) References Cited

U.S. PATENT DOCUMENTS

| | | | |
|---|---|---|---|
| 8,852,492 B2 | 10/2014 | Schoenberger et al. | |
| 9,045,285 B2 | 6/2015 | Schoenberger et al. | |
| 2010/0052224 A1* | 3/2010 | Humele | B29B 13/024 |
| | | | 264/489 |

(Continued)

FOREIGN PATENT DOCUMENTS

| | | |
|---|---|---|
| CN | 102950759 | 3/2013 |
| CN | 103538167 | 1/2014 |

(Continued)

OTHER PUBLICATIONS

German Search Report dated Jan. 19, 2016, issued in corresponding German Application No. 10 2015 106 744.7.

(Continued)

*Primary Examiner* — Robert B Davis
(74) *Attorney, Agent, or Firm* — Onello & Mello, LLP

(57) ABSTRACT

Apparatus for heating plastic preforms, having a microwave generating device which generates microwaves, and having a resonator device which forms a receiving space into which the plastic preforms can be introduced so as to be acted upon by the microwaves in the resonator device in order to be heated, wherein the apparatus has a reflector element which is arranged at least partially in the receiving space and which is suitable and intended for conducting microwaves in the direction of a base region of the plastic preforms. According to the invention, the reflector element is movable relative to the receiving space and the apparatus has a drive device for moving the reflector element relative to the receiving space.

7 Claims, 2 Drawing Sheets

(51) Int. Cl.
  *B29C 49/64* (2006.01)
  *B29C 49/68* (2006.01)
  *H05B 6/74* (2006.01)
  *H05B 6/80* (2006.01)
  *B29C 49/06* (2006.01)
  *B29L 31/00* (2006.01)

(52) U.S. Cl.
  CPC .......... *B29C 49/06* (2013.01); *B29C 49/6409* (2013.01); *B29L 2031/00* (2013.01)

(56) References Cited

U.S. PATENT DOCUMENTS

| | | |
|---|---|---|
| 2011/0253708 A1 | 10/2011 | Zimmerer et al. |
| 2013/0011807 A1* | 1/2013 | Winzinger ............ B29B 13/024 432/43 |
| 2013/0052295 A1 | 2/2013 | Schoenberger et al. |
| 2014/0014466 A1 | 1/2014 | Schoenberger et al. |

FOREIGN PATENT DOCUMENTS

| | | |
|---|---|---|
| DE | 102008060572 | 6/2010 |
| DE | 102011052899 | 2/2013 |
| DE | 102012106308 | 5/2014 |
| DE | 102012107811 | 5/2014 |
| JP | S63307928 A | 12/1988 |
| JP | 02154289 | 6/1990 |

OTHER PUBLICATIONS

Chinese Office Action dated Dec. 27, 2017 issued in Corresponding Chinese Application No. 201610265716.3 and English language translation.

Extended European Search Report dated Sep. 29, 2016 issued in corresponding German Application No. 16167982.4.

Chinese Office Action dated Jan. 29, 2019 issued in corresponding Chinese Application No. 201610265716.3, with English translation.

* cited by examiner

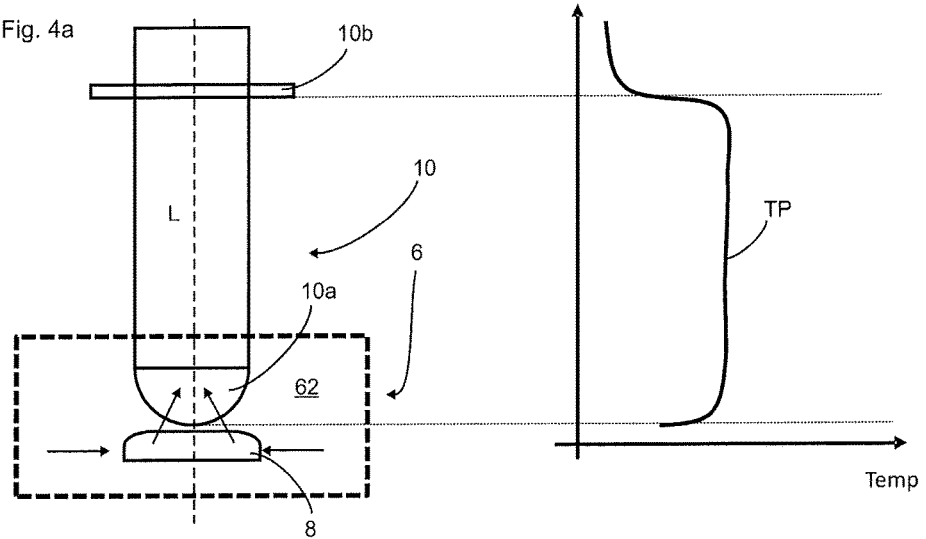
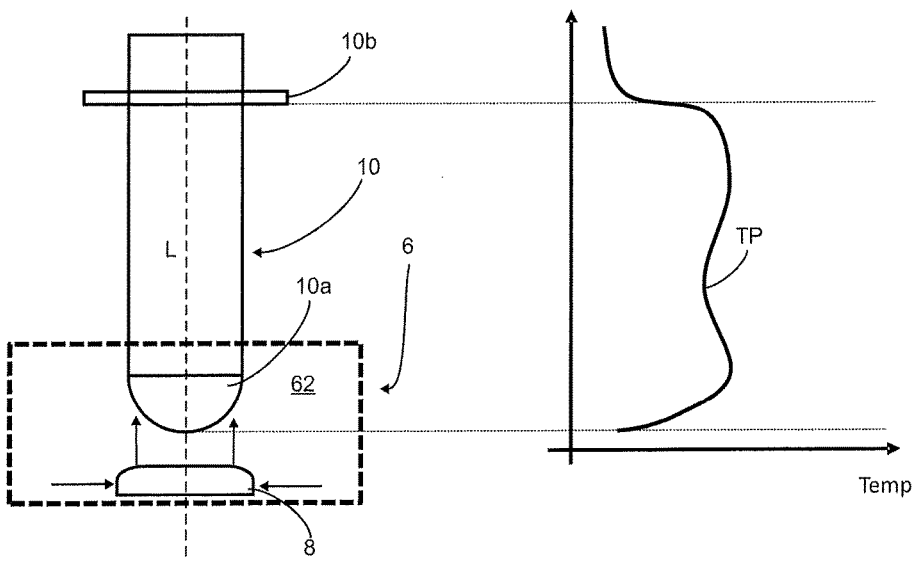

APPARATUS AND METHOD FOR HEATING PLASTIC PREFORMS BY MEANS OF MICROWAVES USING AN ADAPTABLE BASE REFLECTOR

The present invention relates to an apparatus and a method for heating plastic preforms. Such methods and apparatuses are known in the prior art. In the beverage production industry, it is known that firstly so-called plastic preforms are heated and then the plastic preforms thus heated are expanded, in particular blow-moulded, to form plastic containers. In apparatuses known from the prior art, the plastic preforms are transported through a furnace and are heated therein by means of infrared radiation. More recently, however, a transition has also partially been made to using microwaves instead of infrared light to heat plastic preforms.

In order to heat plastic preforms by means of microwaves, the plastic preforms are introduced into a resonator or applicator. It is known from the prior art of the applicant to use a base reflector in the resonator or applicator for example for heating the dome of the plastic preforms, in order to adapt the microwave field to the geometry of this dome.

The shape of this reflector element influences the electric field in the applicator. By varying the field, the absorption of the microwave radiation by the plastic preform and thus also the position and shape of the applied temperature profile on the dome is also defined or influenced.

The object of the present invention is to increase the precision for such heating processes. In addition, the intention is also to enhance the ability of these heating processes to be controlled and/or monitored. These objects are achieved according to the invention by the subject matters of the independent claims. Advantageous embodiments and further developments form the subject matter of the dependent claims.

An apparatus according to the invention for heating plastic preforms has at least one microwave generating device which generates microwaves, and a resonator device which forms a receiving space into which the plastic preforms can be introduced so as to be acted upon by the microwaves in the resonator device in order to be heated. Furthermore, the apparatus has at least one reflector element which is arranged at least partially in the receiving space and which is suitable and intended for conducting and/or reflecting microwaves for example in the direction of a base region of the plastic preforms.

According to the invention, the reflector element is movable relative to the receiving space and the apparatus has a drive device for moving the reflector element relative to the receiving space. Preferably, the reflector element is automatically movable.

In contrast to the prior art, therefore, it is proposed that not only is said reflector element present, but it is also arranged in a movable manner and in particular is arranged in such a way as to be movable by means of a drive. By virtue of such a drive, the process of heating the plastic preforms can be set in a very precise manner. For example, it would be possible that the reflector element is positioned by its own drive. In this case, a mechanical coupling to the position of the plastic preform would be conceivable, but it would also be possible and preferred that the base reflector element is also controllable independently of the movement of the plastic preform.

Advantageously, at least one microwave generating device is selected from a group of microwave generating devices which includes magnetrons, klystrons or solid-state sources. With particular advantage, the microwave generating device is a so-called magnetron. Advantageously, the apparatus also has a conducting device which conducts the microwaves generated by the microwave generating device to the resonator device or to the applicator. This may be, in particular but not exclusively, a waveguide.

Advantageously, the resonator device is arranged on a movable carrier. The movable carrier is advantageously a rotatable carrier. In a further advantageous embodiment, the apparatus has a plurality of such resonator devices, which are each arranged on a common carrier.

In this case, preferably each of these resonator devices has a reflector element of the type described above. Preferably, the movements of these reflector elements relative to their respective resonator devices and/or to the receiving spaces are movable. Preferably, also drive devices for moving the reflector elements are assigned to each individual resonator device. These drive devices are preferably controllable independently of one another so that also the relative movements of the individual reflector elements are controllable independently of one another. In this way, an individual adaptation of the individual resonator devices is possible.

In a further advantageous embodiment, the apparatus has movement devices for introducing the plastic preform into the resonator device. In particular, the movement device is suitable and intended for introducing the plastic preform along its longitudinal direction into the resonator device. Advantageously, this movement device has an electric motor drive and in particular a linear motor.

Preferably, the drive device for moving the reflector elements has a drive selected from a group of drives which includes electric drives, in particular electric motor drives, pneumatic drives, hydraulic drives or magnetic drives. With particular preference, the drive has a linear motor.

In a further advantageous embodiment, the apparatus also has a detection device which detects a value that is characteristic of a relative position of the reflector element relative to the receiving space. This could be an optical detection device, but preferably this value can be determined directly by a controller of the drive device for the reflector element, for instance from a controller of a servo motor. Preferably, this value can also be taken into account when controlling the position of the reflector element.

Preferably, the movement of the reflector element is also controllable as a function of the movement of the plastic preform in its longitudinal direction. This means that, during a process of heating a particular plastic preform, additionally also the distance between the plastic preform and the reflector element can be varied by a movement of the reflector element relative to the receiving space. For example, it would be conceivable that the plastic preform is pushed into the resonator, for example is moved vertically downwards, at a certain speed v1 and in the same time period the reflector element is moved vertically downwards at a different speed v2 and in this way, during the heating of the plastic preform, the distance between the plastic preform and the reflector element varies at the speed v2-v1.

Preferably, therefore, the movement of the reflector element relative to the receiving space is controllable independently of a movement of the plastic preform relative to the receiving space. However, it would also be conceivable and preferred that a control device for these movements in any event prevents a collision between the plastic preform and the reflector element.

In a further advantageous embodiment, a distribution of the microwaves onto the plastic preform can also be adapted in particular by a change in position of the reflector element.

Preferably, a temperature distribution on the individual sections of the plastic preform can also be varied.

In a further advantageous embodiment, the apparatus also has an additional heating device in the form of an infrared heating device. For example, such an infrared heating device may be arranged upstream of the microwave heating device. In this way, the efficiency of the apparatus can be increased since the heating by means of microwaves is more efficient in the case of plastic preforms that have already been preheated than in the case of plastic preforms at room temperature.

In a further advantageous embodiment, a device for transforming plastic preforms into plastic containers, and in particular a blow moulding machine, particularly preferably a stretch blow moulding machine, is arranged downstream of the heating device.

The receiving space for receiving the plastic preforms in order to heat the latter may be closed at the bottom, but it would also be possible that the receiving space is open at two opposite sides. Advantageously, however, a circumferential wall of the receiving space completely surrounds the plastic preform in its circumferential direction.

In a further advantageous embodiment, a distance between the plastic preform and the reflector element in a longitudinal direction of the plastic preform is variable. This means that the reflector element can in particular be moved closer to a dome region of the plastic preform or moved further away therefrom.

Advantageously, the reflector element at least during the heating of the plastic preform is arranged below a closed end of the plastic preform, that is to say below a base dome of the plastic preform. In this case, it is preferably possible that the reflector element is arranged centrally below the plastic preform. Besides the movement of the reflector element in the longitudinal direction of the plastic preform as described here, however, other movements would also be conceivable as an alternative or in addition, such as for example a movement perpendicular to the longitudinal direction of the plastic preform or also a tilting or rotation of the reflector element.

In a further advantageous embodiment, the apparatus has a sensor device for detecting at least one parameter that is characteristic of a heating of the plastic preform and/or in general a physical parameter that is characteristic of the plastic preform to be heated. In the prior art, the distance of the reflector element from the plastic preform is fixedly set or has a fixedly set value. In the case of a mechanical coupling, this value is achieved either by a fitting part, for example a ring and holder combination for each plastic preform or each type of plastic preform, or else an adjustable coupling with defined setting values is formed.

If, as described here, an own drive is present for the reflector element, the distance between the plastic preform and the reflector element can be varied.

In a further advantageous embodiment, the apparatus has a rotating device for rotating the plastic preforms about their longitudinal axes. This means that the plastic preform can also be rotated relative to its longitudinal direction as it is being heated. In this case, it is conceivable that a temperature of the plastic preform can also be detected as a function of its rotational position. In this way, if desired, a temperature profile of the plastic preform in its circumferential direction can also be determined.

In the prior art it is conceivable that, in the event of changes to the plastic preform (material composition, geometry, temperature), also the absorption properties may change. Given a fixedly defined distance or a fixedly defined position, therefore, a varied temperature profile is thus applied which may have a negative effect on subsequent process steps (in particular the subsequent transforming or blow moulding process).

The invention therefore provides that the reflector element for influencing the field can be moved via a different drive, by which also the position in the process can be adapted. The position of the reflector element is thus not fixedly linked to a type of plastic preform, but rather can be varied during the process, that is to say during a heating process and/or between the processes of heating individual plastic preforms.

In a further advantageous embodiment, the apparatus has a sensor device for detecting at least one parameter that is characteristic of a heating of the plastic preform. In this embodiment, as will be explained in more detail below, it is proposed that a change or adaptation of the position of the reflector element is also performed as a function of corresponding characteristic and determined values of the plastic preform. Preferably, said sensor device is a temperature measuring device which detects, preferably in a contactless manner, a temperature of the plastic preforms. It is thus possible, using suitable sensors, to use control and adjustment values to vary the position of the reflector element relative to the plastic preform. As an alternative or in addition to a temperature sensor, a power sensor may also be provided.

In a further advantageous embodiment, the apparatus has a control device for controlling the drive device and this control device is suitable and intended for controlling the movement of the reflector element as a function of at least one value that is characteristic of a heating of the plastic preforms. It is thus proposed that the distance between the reflector element and the plastic preform, particularly during the heating, is also related to said parameter, for instance the temperature of the plastic preform, and is controlled accordingly.

As mentioned, an adaptation of a distance between the reflector element and the plastic preform preferably takes place during a heating of the plastic preform. In addition, however, it would also be possible that the control device controls a movement of introducing the plastic preform or in general the movement of the plastic preform in its longitudinal direction during the heating.

Preferably, the control device is an adjusting device. In this case, preferably the temperature is an input variable and the distance between the reflector element and the plastic preform is an output variable or an adjusting variable.

In a further advantageous embodiment, the reflector element has a circular and/or ring-shaped cross-section. In this case, preferably a plane of this circle or ring is perpendicular to the longitudinal direction of the plastic preform. The reflector element preferably has a rotationally symmetrical cross-section. In a further preferred embodiment, the reflector device is made of a metal. With particular preference, the reflector device is a metal ring.

In this case, it is possible that this reflector device is arranged on a carrier (in particular a non-metallic carrier).

In a further advantageous embodiment, the apparatus has a transport device which transports the resonator device along a predefined transport path. In this case, this transport device may preferably have a carrier, on which a plurality of resonator devices are arranged. With particular preference, this may be a rotatable carrier.

The present invention also relates to a method for heating plastic preforms, wherein plastic preforms to be heated are introduced into a receiving space of a resonator device and are acted upon by microwaves at least intermittently in this receiving space in order to be heated, and wherein microwaves are reflected onto a predefined section of the plastic preform by means of at least one reflector element which is arranged partially within the receiving space.

According to the invention, a geometric position of the reflector element relative to the receiving space is varied at least intermittently.

It is therefore also proposed with regard to the method that a relative position between the reflector element and the receiving space and in particular also between the reflector element and the plastic preform is varied at least intermittently. It is possible that this relative position is varied during a heating process, but it would also be possible that the varying is carried out after a heating process has taken place.

In a further advantageous method, a value that is characteristic of the plastic preform and/or of a physical property of the plastic preform is determined and the geometric position of the reflector element is also controlled and/or adjusted as a function of this value. Preferably, the physical property is a temperature of the plastic preform. In this case, it is advantageously possible that this temperature of the plastic preform is detected in a contactless manner.

Preferably, the physical property is determined multiple times and/or continuously. With particular preference, this physical property, such as for example a temperature, is also determined as a function of a further variable, such as for example the longitudinal direction of the plastic preform to be heated. In this way, a profile of this variable, for example a temperature profile, can be recorded.

In addition, however, the physical property may also be recorded as a function of other parameters, such as for example a cross-section of the plastic preforms, and/or as a function of a position of the plastic preform relative to the resonator device. In a further advantageous embodiment, at least one measured value (which is characteristic of the physical property) or a plurality of measured values are stored. Advantageously, the abovementioned apparatus therefore has a memory device which is provided for storing measured values that are characteristic of the physical property, for example temperature values. Preferably, a control device can read out these stored values in order to control the drive device. In addition, it would also be possible that such measured values are recorded as a function of a distance between the reflector element and the plastic preform, in general as a function of a position of the reflector element in the receiving space.

In a preferred variant, in the process the distance between the reflector element and the plastic preform is set as a function of a temperature of the plastic preform and/or as a function of a current power consumption and/or as a function of a field strength in the resonator device. In this way, the variability, the efficiency and the stability of the process can be increased.

In a further preferred method, a defined temperature profile is applied to a predefined region of the plastic preform, in particular but not exclusively to a dome region of the plastic preform, which preferably has more variability in comparison to a constant distance between the reflector element and the plastic preform.

This variability allows improved heating results with regard to the uniformity of heating through, or else, if desired, a defined profiling and thus better utilization of the quantities of material in the dome region of the plastic preform.

By virtue of the additional variability of the reflector element described according to the invention, the efficiency of the applicator or of the resonator device can be improved in that the power consumption is optimized and adjusted by the distance of the metal ring or of the reflector element. In addition, it is also possible that the stability of the process is improved in that the field strength in the resonator device or in the applicator is kept constant by adjusting the distance, and in this way field strengths capable of forming a plasma are preferably avoided.

However, it would also be possible that an adaptation of the position of the reflector element takes place between the heating of different plastic preforms. In this case, it is conceivable that the distribution of the energy input, that is to say the heating of the plastic preform, is recorded by a suitable sensor device during and/or after the heating process.

By comparing actual and desired profiles, preferably deviations are detected and are compensated by modifying process parameters and in particular also by varying a distance between the reflector element and the plastic preform for the next plastic preform (that is to say the next heating process).

Preferably, therefore, at least one value determined by measurement is compared with at least one further value, in particular a stored value.

In this case, it is conceivable that these process parameters are correlated with energy input values, that is to say it is possible to define heating times, energy quantities or temperature values for sub-sections of the heating process.

In addition, in the context of the invention, the distance of the reflector element from the plastic preforms is also taken into account in this adjustment. In this way, not only the energy quantities but also the distribution thereof are adapted.

By shifting the profile, in particular at the dome region of the plastic preform, the (subsequent) heating steps are applied in a manner shifted to a neck region. Preferably, an adaptation of other process parameters, such as for example the heating times, the energy quantities and the temperature values for sub-sections, is also carried out. In this way, a desired temperature profile can be applied in a defined manner over the entire plastic preform. In this way, it is also conceivable to react to changes on the plastic preform which could not be compensated solely by adapting the energy quantities in the individual regions of the plastic preforms.

In a further advantageous method, a temperature profile is applied to the plastic preform by a positioning of the reflector element and/or by varying this positioning. For example, such a temperature profile may be applied in a circumferential direction and/or in the longitudinal direction of the plastic preforms.

In a further advantageous method, a geometric position of the reflector element relative to the receiving space is varied during a heating process. In this way, the heating of the individual plastic preforms can be adapted in a quick and individual manner.

Further advantages and embodiments will become apparent from the appended drawings:

In the drawings:

FIG. 4a shows a first diagram to illustrate a heating of a plastic preform;

FIG. 4b shows a second diagram to illustrate the heating of a plastic preform.

Figure 1:
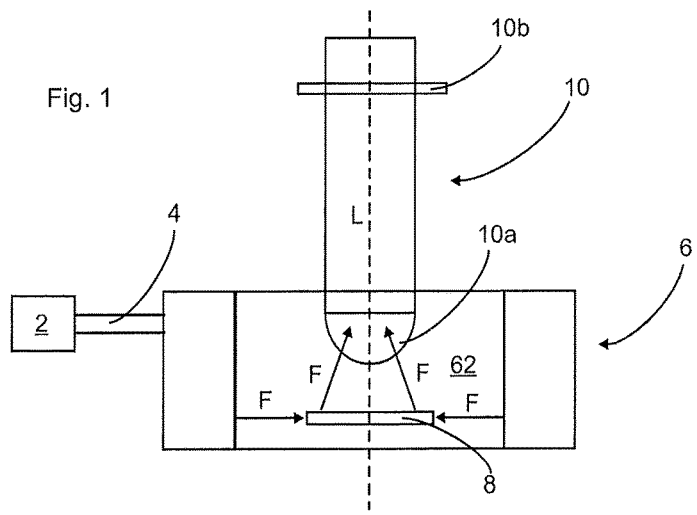
FIG. 1 shows a schematic diagram of an apparatus according to the prior art.

FIG. 1 shows a schematic diagram of a heating process for a plastic preform 10. This plastic preform 10 has a carrying ring 10b and a dome region 10a. Reference 6 denotes in its entirety a resonator device into which the plastic preform 10 is pushed along its longitudinal direction L. Reference 62 accordingly denotes a receiving space which serves to receive the plastic preform 10. Arranged within this receiving space is a reflector element 8, for example the above-mentioned metal ring.

A microwave generating device 2, such as for example a magnetron, generates microwaves which pass via a feed device 4, such as a waveguide, to the resonator device 6. A movement of the reflector element 8 relative to the plastic preform or relative to the receiving space 62 is not provided in the prior art shown in FIG. 1. The arrows F indicate in a highly schematic manner the microwave field which serves to heat the plastic preforms 10.

Figure 2:
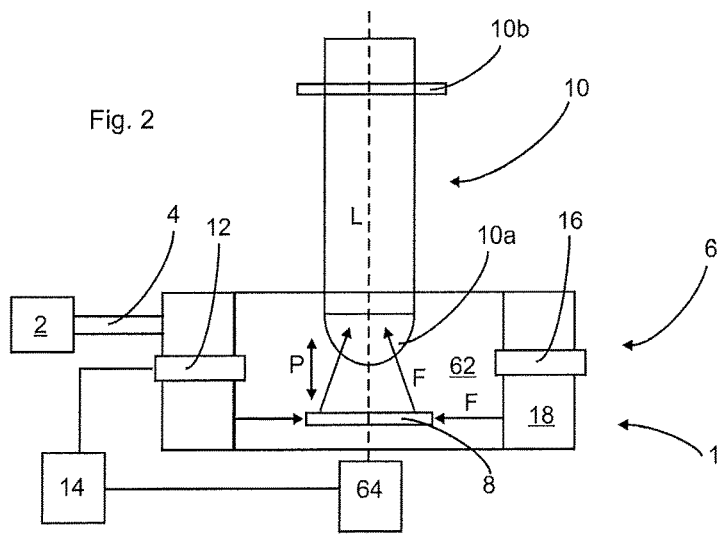
FIG. 2 shows a diagram of an apparatus according to the invention.

FIG. 2 shows a schematic diagram of an apparatus 1 according to the invention. In this apparatus 1, now a drive device 64 is provided, by means of which the reflector element 8 can in this case be moved likewise in the longitudinal direction L and thus can be moved closer to the plastic preform or moved further away from the plastic preform 10. This drive device 64 may be for example a linear motor.

Reference 12 denotes a first sensor device which measures a parameter that is characteristic of the plastic preform, in particular a temperature. This sensor device may be for example a pyrometer. A control device 14 controls the drive device 64 and thus also the movement of the reflector element 8 along the double-headed arrow P.

In addition, a power measuring device 16 may also be provided, which measures a microwave power in the interior of the resonator device 6 or in the receiving space 62.

Reference 18 denotes a circumferential wall of the resonator device 6. This runs in particular around the longitudinal axis L of the plastic preform 10. The arrows F coming from this wall and directed towards the reflector element again illustrate the microwaves which are reflected by the reflector element in the direction of the plastic preform 10, more specifically towards the dome region 10a thereof.

Figure 3:
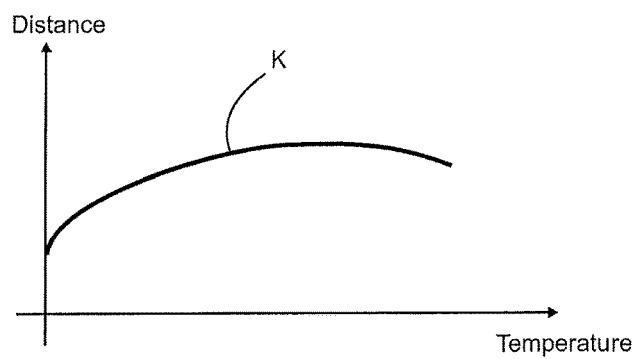
FIG. 3 shows a diagram of a relationship between a temperature and a distance of the reflector element from the plastic preform.

FIG. 3 shows a relationship (curve K) between a temperature of the plastic preform 10 and a distance between the plastic preform 10 and the reflector element 8. Also on the basis of such measurement results, it is possible that the stability of the entire heating process is improved, in that the field strength in the resonator device 6 is kept constant by adjusting the distance in order, as mentioned above, to prevent field strengths capable of forming a plasma.

FIGS. 4a and 4b once again illustrate the adjustment of the position of the reflector element 8 (relative to the receiving space and/or the plastic preform), but here the drive device is not shown. As mentioned, one concept of the invention lies in the fact that also the distance of the reflector element 8 from the plastic preform is included in the adjustment. In this embodiment, firstly the heating of the plastic preform 10 is measured in a given position of the reflector element 8 shown in FIG. 4B. In particular, therefore, a temperature profile TP based on the longitudinal direction L of the plastic preform 10 is recorded.

If it is then found that the temperature distribution is to be adapted, then, as in the upper sub-image (FIG. 4a), the reflector element is raised upwards and thus the distance from the plastic preform 10 or the dome 10a thereof is reduced. The temperature is then measured again after the heating process. It can be seen that, in the diagram shown in FIG. 4b, less microwave power reaches the dome region and therefore the dome region is only lightly heated. In the first diagram shown in FIG. 4a, in which the reflector element 8 is arranged closer to the plastic preform 10, a more favourable temperature distribution is thus obtained (see the right-hand sub-image in each case). The energy input into the preform can therefore be influenced by the variable movement of the reflector element. In particular, a temperature profile can be applied to the preform by the variable movement of the reflector element.

The applicant reserves the right to claim as essential to the invention all the features disclosed in the application documents in so far as these are novel individually or in combination with respect to the prior art. It is also pointed out that also features which may be advantageous individually have been described in the individual figures. A person skilled in the art is immediately aware that a particular feature described in one figure can also be advantageous even without taking further features from this figure. A person skilled in the art is also aware that advantages may also arise through a combination of multiple features shown in individual figures or in different figures.

LIST OF REFERENCES 1 apparatus
2 microwave generating device
4 feed device, waveguide
6 resonator device
8 reflector element
10 plastic preform
10a dome region
10b carrying ring
12 sensor device
14 control device
16 power measuring device
18 circumferential wall of the resonator device
62 receiving space of the resonator device
64 drive device
L longitudinal direction
K curve
P double-headed arrow (movement of the reflector element)
TP temperature profile
F microwave field

The invention claimed is:

1. Apparatus for heating plastic preforms, having a microwave generating device which generates microwaves, and having a resonator device which forms a receiving space into which the plastic preforms can be introduced so as to be acted upon by the microwaves in the resonator device in order to be heated, wherein the apparatus has a reflector element which is arranged at least partially in the receiving space and which is suitable and intended for conducting microwaves in the direction of a base region of the plastic preforms, characterized in that the reflector element is movable relative to the receiving space and the apparatus has a drive device for moving the reflector element relative to the receiving space, wherein the reflector element has a ring-shaped cross-section, and wherein the apparatus preferably has a control device for controlling the drive device and this control device is suitable and intended for controlling the movement of the reflector element as a function of at least one value that is characteristic of a heating of the plastic preforms.

2. Apparatus according to claim 1, wherein a distance between the plastic preform and the reflector element in a longitudinal direction of the plastic preform is variable.

3. Apparatus according to claim 1, wherein the apparatus has a sensor device for detecting at least one parameter that is characteristic of a heating of the plastic preform.

4. Apparatus according to claim 3, wherein the sensor device is a temperature measuring device which detects, preferably in a contactless manner, a temperature of the plastic preforms.

5. Apparatus according to claim 1, wherein the apparatus has a transport device which transports the resonator device along a predefined transport path.

6. Apparatus according to claim 1, wherein the reflector is at least one of circular or ring-shaped.

7. Apparatus according to claim 6, wherein a plane of the ring-shaped reflector element is perpendicular to the longitudinal direction of the plastic preforms.

* * * * *